United States Patent
Taylor et al.

(10) Patent No.: US 9,033,129 B2
(45) Date of Patent: May 19, 2015

(54) PRODUCT DISTRIBUTION CHUTE FOR A WEIGHING MACHINE (SCALES)

(75) Inventors: Alfred Alexander Taylor, Lugarno (AU); Darren Ken Alchin, Lane Cove North (AU)

(73) Assignee: TNA Australia Pty Limited, Lidcombe, New South Wales (AU)

( * ) Notice: Subject to any disclaimer, the term of this patent is extended or adjusted under 35 U.S.C. 154(b) by 354 days.

(21) Appl. No.: 13/273,006

(22) Filed: Oct. 13, 2011

(65) Prior Publication Data

US 2012/0103753 A1    May 3, 2012

(30) Foreign Application Priority Data

Nov. 3, 2010    (AU) .................................. 2010904908

(51) Int. Cl.
*B65G 11/00* (2006.01)
*G01G 19/393* (2006.01)
*B65G 11/02* (2006.01)

(52) U.S. Cl.
CPC ............ *G01G 19/393* (2013.01); *B65G 11/023* (2013.01)

(58) Field of Classification Search
USPC ........................................ 193/2 R; 177/25.18
See application file for complete search history.

(56) References Cited

U.S. PATENT DOCUMENTS

| 4,398,612 | A | * | 8/1983 | Mikami et al. ............. 177/25.18 |
| 4,444,283 | A | * | 4/1984 | Mikami .......................... 177/59 |
| 4,467,882 | A | * | 8/1984 | Mikami .......................... 177/58 |
| 4,516,644 | A |   | 5/1985 | Fukuda |
| 4,561,510 | A | * | 12/1985 | Sugioka et al. ................. 177/84 |
| 4,683,966 | A | * | 8/1987 | Nakagawa et al. ......... 177/25.18 |
| 5,074,436 | A | * | 12/1991 | Inoue .............................. 222/56 |
| 2004/0007444 | A1 |  | 1/2004 | Baranowski |

OTHER PUBLICATIONS

European Search Report mailed on Feb. 3, 2012 for EP Patent Application No. 11187691.8, 7 pages.

* cited by examiner

*Primary Examiner* — William R Harp
(74) *Attorney, Agent, or Firm* — Kilpatrick Townsend & Stockton LLP

(57) ABSTRACT

A weighing machine (10) that may be scales employed in the packaging industry to deliver batches of product to a packaging machine below the weighing machine (10). The weighing machine (10) has a plurality of troughs (19) along which the product passes and that extend downwardly away from a generally central upright longitudinal axis (11). Each trough (19) extends downwardly from an inlet portion (21) to an outlet portion (22), with the outlet portion (22) spaced radially and angularly from the inlet portion (21) relative to the axis (11).

9 Claims, 1 Drawing Sheet

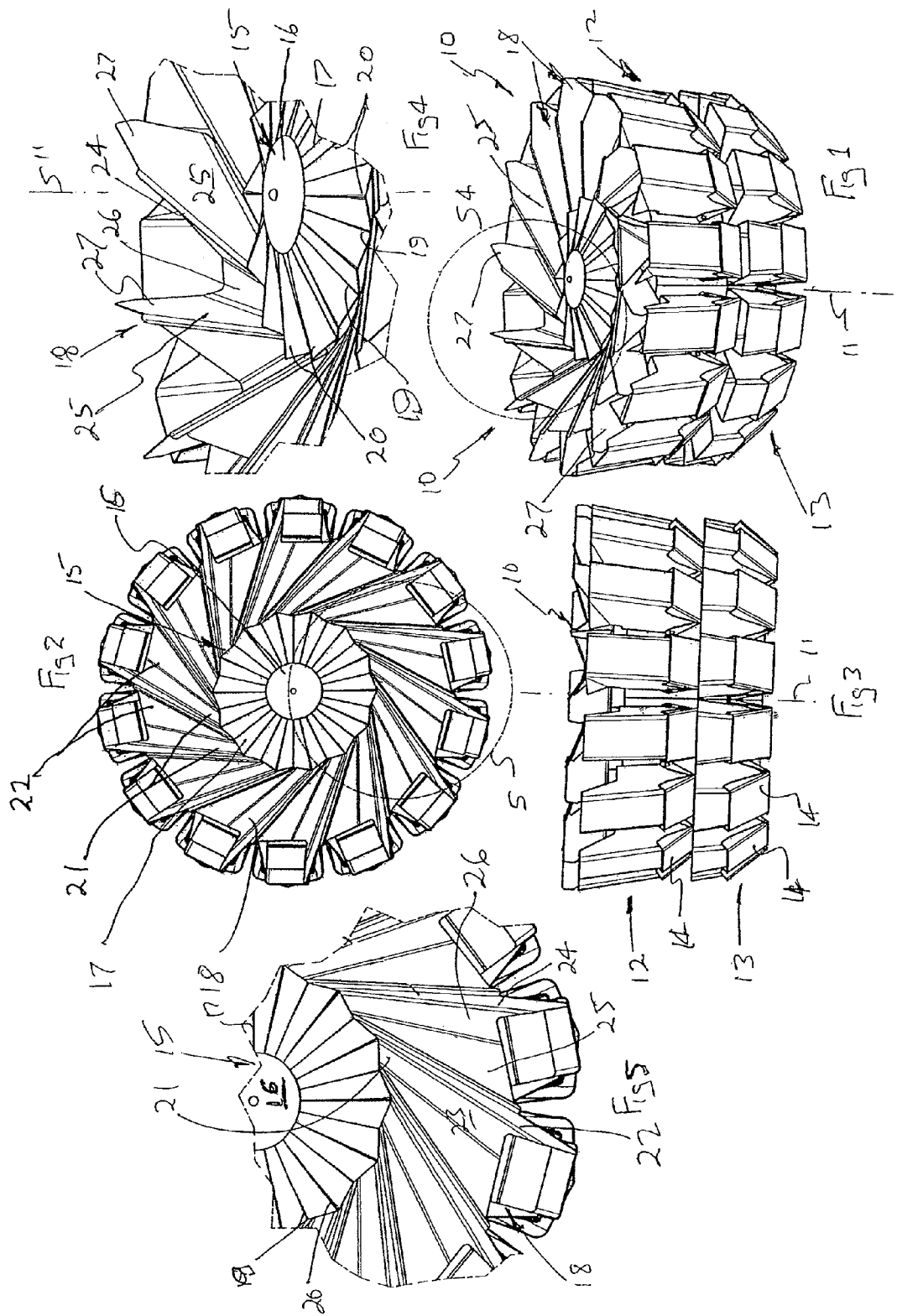

PRODUCT DISTRIBUTION CHUTE FOR A WEIGHING MACHINE (SCALES)

TECHNICAL FIELD

The present invention relates to weighing machines (scales) and more particularly but not exclusively to chutes employed in weighing machines that weigh product and deliver the product in packages to a packaging machine, via a former.

BACKGROUND OF THE INVENTION

In the packaging industry, particularly relating to the packaging of snack foods, weighing machines (scales) receive product and deliver the product in batches to a packaging machine below. The weighing machine includes a first set of buckets (hoppers) that accumulate the product, and then deliver the product to a second set of buckets which weigh the product. The second set of buckets are then actuated so that batches of a desired weight are delivered to a former and then ultimately the packaging machine below.

The weighing machine also includes a centre cone to which the product is initially delivered. The centre cone directs product to a plurality of chutes that extend generally radially and downwardly from the cone to the first set of buckets.

The weighing machines have a generally upright central longitudinal axis, with each of the distribution chutes having a longitudinal axis located in a plane passing through the longitudinal axis. Accordingly, the chutes extend radially relative to the longitudinal axis.

The above described packaging machines have a disadvantage in that the delivery chutes have very little control over the flow of product to the first set of buckets (hoppers). In particular if one of the buckets is disabled, the product will continue to flow to the disabled bucket and overflow.

OBJECT OF THE INVENTION

It is the object of the present invention to overcome or substantially ameliorate the above disadvantage.

SUMMARY OF THE INVENTION

There is disclosed herein a chute assembly for a weighing machine, the assembly including:
a generally upright central longitudinal axis;
a plurality of chutes extending outwardly relatively to the axis, each chute having an inlet portion and an outlet portion, with the inlet portion located closer to the axis than the outlet portion;
a chute passage extending between the inlet portion and the outlet portion along which product is to flow, the passage being downwardly sloping toward the outlet portion so that product will move along the passage under the influence of gravity; and wherein
said outlet portion is spaced radially and angularly relative to said axis from said inlet portion.

Preferably, each passage is generally linear.

Preferably, each chute has a pair of longitudinally extending side walls extending upwardly from a longitudinally extending floor.

Preferably, one of the side walls is generally upright.

Preferably, a first one of said side walls is generally upright, and a second one of said side walls diverges upwardly and outward from the floor relative to the first wall.

Preferably, said floor slopes longitudinally downwardly away from said axis.

There is further disclosed herein in combination, the chute assembly and a plurality of buckets, each bucket being operatively associated with a respective one of the chutes, with at least one of said side walls extending into its respective bucket.

BRIEF DESCRIPTION OF THE DRAWINGS

Preferred forms of the present invention will now be described by way of example with reference to the accompanying drawings wherein:

FIG. 1 is a schematic isometric view of a weighing machine (scales);

FIG. 2 is a schematic top plan view of the weighing machine of FIG. 1;

FIG. 3 is a schematic side elevation of the weighing machine of FIG. 1;

FIG. 4 is a schematic isometric view of the portion "4" of FIG. 1; and

FIG. 5 is a schematic enlarged view of the portion of "5" of FIG. 2.

DETAILED DESCRIPTION OF THE PREFERRED EMBODIMENTS

In the accompanying drawings there is schematically depicted a weighing machine 10. As an example, the weighing machine 10 may be scales employed in the packaging industry to deliver batches of product to a packaging machine located below the machine 10.

The machine 10 has a generally upright longitudinal axis 11. Arranged around the axis 11 is a first set of buckets 12 commonly referred to as hoppers, that receive and store product for delivery to a second set of buckets 13. The buckets 13 have weight cells and weigh product located in the buckets 13. A selected number of the buckets 13 are opened so that batches of product of a desired weight are delivered to the packaging machine below.

The buckets 12 and 13 have doors 14 that are movable between an open position and closed position. In respect of the buckets 12, when the doors 14 are open the product is delivered to the buckets 13. When the doors 14 of the buckets 13 are opened, the product is delivered to chutes below the machine 10, the chutes leading to a former that then delivers the product to the packaging machine.

The machine 10 includes a central cone assembly 15 that includes a centre cone 16 to which the product is initially delivered. The centre cone 16 has a downwardly sloping conical surface that delivers the product to a fluted conical portion 17 that has a plurality of troughs 19 and ridges 20 that extend generally radially relative to the axis 11. The troughs 19 and ridges 20 of the portion 17 allow the product to flow downwardly under the influence of gravity for delivery to the chutes 18.

Each of the troughs 19 is aligned with a respective one of the chutes 18 so as to deliver product to the associated chute 18.

Each chute 18 has an inlet end portion 21, and an outlet end portion 22, with each chute 18 having a longitudinal passage 23 along which the product flows.

Each outlet portion 23 is spaced further from the axis 11 than the associated inlet portion 21. Preferably, each passage 23 is generally linear. However as an alternative, the passages may be slightly curved about the axis 11.

As best seen in FIGS. 2 and 5, each outlet portion 22 is spaced radially further out relative to its associated inlet portion 21 as well as being displaced angularly about the axis 11 relative to its associated inlet portion 21.

Each chute 18 includes a pair of side walls 24 and 25, as well as a floor 26 from which the walls 24 and 25 extend upwardly. Preferably the wall 24 is generally upright, while the wall 25 diverges upwardly from the floor 26 relative to the wall 24.

The floor 26 slopes longitudinally downwardly from the inlet portion 21 to the outlet portion 22 (away from the axis 11) so that the product flows therealong under the influence of gravity.

Preferably, each wall 25 has an end portion 27 that projects into the associated bucket 12.

The invention claimed is:

1. A weighing machine, comprising:
   a plurality of buckets; and
   a chute assembly, comprising:
   a generally upright central longitudinal axis;
   a plurality of chutes extending outwardly relatively to the axis, wherein each chute is configured to deliver product to a respective one of the buckets, wherein each chute comprises:
   an inlet portion;
   an outlet portion;
   wherein the inlet portion is located closer to the axis than the outlet portion, and wherein the outlet portion is spaced radially and angularly relative to the axis from the inlet portion;
   a longitudinally extending floor defining a chute passage extending between the inlet portion and the outlet portion, the chute passage being configured for product to flow therealong, the chute passage being downwardly sloping toward the outlet portion so that the product will move along the chute passage under the influence of gravity;
   a first side wall extending upwardly from the floor; and
   a second side wall extending upwardly from the floor, wherein the second side wall comprises an end portion that projects into the respective one of the buckets.

2. The machine of claim 1, wherein each passage is generally straight.

3. The machine of claim 1, wherein one of the side walls is generally upright.

4. The machine of claim 3, wherein the first side wall is generally upright.

5. The machine of claim 1, wherein one of said side walls is generally upright, and another one of said side walls diverges upwardly and outward from the floor relative to the one wall.

6. The machine of claim 5, wherein the first side wall is generally upright, and the second side wall diverges upwardly and outward from the floor relative to the side wall.

7. The machine of claim 1, wherein each bucket is operatively associated with a respective one of the chutes by having the end portion of the second side wall extending into its respective bucket.

8. The machine of claim 1, further comprising a central cone comprising a plurality of downwardly sloping troughs and a plurality of downwardly sloping ridges, wherein each trough is aligned with a respective one of the passages so as to deliver the product thereto.

9. The machine of claim 8, wherein each bucket is operatively associated with a respective one of the chutes.

\* \* \* \* \*